(12) United States Patent
Petermaier (10) Patent No.: US 10,208,515 B2
(45) Date of Patent: Feb. 19, 2019

(54) ANTI-ROTATION DEVICE FOR A LOCK SYSTEM

(71) Applicant: Lisa Draexlmaier GmbH, Vilsbiburg (DE)

(72) Inventor: Johann Petermaier, Dingolfing (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 0 days.

(21) Appl. No.: 15/719,613

(22) Filed: Sep. 29, 2017

(65) Prior Publication Data

US 2018/0094461 A1 Apr. 5, 2018

(30) Foreign Application Priority Data

Oct. 5, 2016 (DE) .................... 10 2016 118 843

(51) Int. Cl.
*E05B 79/08* (2014.01)
*E05B 83/30* (2014.01)
*B60R 7/06* (2006.01)

(52) U.S. Cl.
CPC .............. *E05B 79/08* (2013.01); *E05B 83/30* (2013.01); *B60R 7/06* (2013.01)

(58) Field of Classification Search
CPC ....... B60R 7/06; Y10T 70/8973; E05B 79/00; E05B 79/02; E05B 79/04; E05B 79/08; E05B 83/30
USPC ............ 70/208, 367–375, DIG. 13, DIG. 32, 70/379 R, 379 A, 380, 381, 448, 449, 70/451, 466; 296/37.12
See application file for complete search history.

(56) References Cited

U.S. PATENT DOCUMENTS

| 2,745,275 | A | | 5/1956 | Jacobi | |
|---|---|---|---|---|---|
| 3,824,817 | A | | 7/1974 | Orr | |
| 4,441,347 | A | * | 4/1984 | Taylor | E05B 35/12 248/222.52 |
| 4,756,638 | A | | 7/1988 | Neyret | |
| 4,910,982 | A | * | 3/1990 | Dana | E05B 9/08 70/370 |
| 5,056,344 | A | * | 10/1991 | Bartczak | E05B 15/02 70/381 |
| 5,297,405 | A | * | 3/1994 | Manning | E05B 9/084 292/DIG. 38 |
| 5,457,975 | A | * | 10/1995 | Berger | E05B 9/084 70/370 |

(Continued)

FOREIGN PATENT DOCUMENTS

| DE | 1020090044598 | 5/2011 |
|---|---|---|
| EP | 0537645 | 4/1993 |
| JP | 2004076449 | 3/2004 |

*Primary Examiner* — Lloyd A Gall
(74) *Attorney, Agent, or Firm* — Burris Law, PLLC (57) ABSTRACT

The present disclosure shows an anti-rotation device for a lock system in a motor vehicle, comprising a base cover unit having an opening for passage of a lock system; a cover unit; a rotor rotatably attached to a back side of the base cover unit by a latch mechanism, in which the rotor has a radial rib structure; a hollow receiving body accommodating the rotor and having a recess; and an interlock system on a circumferential line of the recess of the receiving body. On rotation of the rotor in the receiving body the position of the rotor in the receiving body is ascertained by the contact of the interlock system with the rib structure.

16 Claims, 5 Drawing Sheets

(56) References Cited

U.S. PATENT DOCUMENTS

| | | | | |
|---|---|---|---|---|
| 5,605,064 A * | 2/1997 | Katayama | E05B 13/108 | 292/336.3 |
| 5,730,011 A * | 3/1998 | Terai | B60R 25/02105 | 70/186 |
| 5,732,580 A * | 3/1998 | Garnault | E05B 17/04 | 70/360 |
| 5,907,963 A * | 6/1999 | Myers | E05B 9/086 | 70/371 |
| 6,085,558 A * | 7/2000 | Strathmann | E05B 9/084 | 292/107 |
| 6,393,882 B1 * | 5/2002 | Higgins | E05B 85/02 | 292/DIG. 53 |
| 6,463,774 B2 * | 10/2002 | Sokurenko | E05B 9/08 | 292/DIG. 37 |
| 6,471,263 B1 * | 10/2002 | Choo | B60J 1/1884 | 292/336.3 |
| 6,494,066 B2 * | 12/2002 | Muneta | E05B 9/084 | 292/DIG. 53 |
| 6,502,439 B1 * | 1/2003 | Stirling | E05B 9/084 | 70/357 |
| 6,508,092 B1 * | 1/2003 | Laabs | E05B 9/084 | 24/297 |
| 6,550,295 B2 * | 4/2003 | Hubner | E05B 79/06 | 292/336.3 |
| 6,595,033 B1 * | 7/2003 | Hara | E05B 9/084 | 70/370 |
| 6,966,206 B2 * | 11/2005 | Masseth, Jr. | E05B 9/084 | 70/370 |
| 7,104,098 B2 * | 9/2006 | Romero | E05B 13/10 | 292/353 |
| 7,444,845 B2 * | 11/2008 | Kargilis | E05B 9/084 | 70/370 |
| 8,893,535 B2 * | 11/2014 | Zimmer | E05B 85/02 | 70/370 |
| 9,428,936 B2 * | 8/2016 | Fenayon | E05B 77/44 | |
| 2007/0163310 A1 * | 7/2007 | Ookawara | E05B 83/30 | 70/208 |

* cited by examiner

ANTI-ROTATION DEVICE FOR A LOCK SYSTEM

CROSS-REFERENCE TO RELATED APPLICATIONS

This application claims priority to and the benefit of German Patent Application No. DE 10 2016 118 843.3 filed on Oct. 5, 2016. The disclosure of the above application is incorporated herein by reference.

FIELD

The present disclosure relates to an anti-rotation device for a lock system, that is particularly well suited for use in a vehicle such as a motor vehicle.

BACKGROUND

The statements in this section merely provide background information related to the present disclosure and may not constitute prior art.

Storage and transport devices often include closure means, which may be in the form of a lock, lock system or the like, and which are designed for safekeeping goods. Vehicles also frequently include closures such as a locking system for a glove compartment, a storage console, a fuel tank cap and the like.

Problems may arise when a cylinder lock is being installed in a glove compartment configuration if the cylinder lock cannot be precisely inserted in the correctly aligned position or if the installer does not know whether the cylinder lock was inserted in the right position.

The Japanese patent application with publication number 2004-76449 discloses a glove compartment device in which an operating handle that can be rotated in a horizontal direction is mounted on a base member. The base member is attached to a lid covering an opening in a compartment body. Locking and unlocking actions activate a transmission mechanism of a cylinder lock that is attached to a stationary section separately from the operating handle, which makes it possible to switch between transferring and interrupting the transfer of an actuating force of the operating handle in response to the actuated or actuating state of the transmission mechanism.

However, in the glove compartment device disclosed in the Japanese patent application with the publication number 2004-76449, the transmission mechanism includes a large number of components, which makes production and installation more complex and costly. In addition, the structure is complicated, which also adds to the cost of providing this glove compartment device. Furthermore, due to the large number of components, the actuation is slowed during the transfer of the actuating force of the operating handle. This in turn leads to a rapid build-up of an actuating load. The result is a rather poor operating feeling.

Also, the cylinder lock is attached to the stationary section separately from the operating handle. In this case, arranging an end of the cylinder lock in such a manner that it points to a structural surface of the operating handle in its closed position will probably result in a misalignment between the structural surface of the operating handle and the tip or end of the cylinder lock.

SUMMARY

The present disclosure provides an anti-rotation device that includes a receiving unit serving to affix the anti-rotation device in a component to be locked, particularly a part of the interior fittings of a vehicle. An example of such a component to be locked is a glove compartment, a side pocket in the door lining of the vehicle or, in general, any possible compartment to be locked in a vehicle.

The anti-rotation device includes a base cover unit. This base cover unit has an opening through which the lock system is guided, as for example a tumbler that can be locked with a key.

In addition, the anti-rotation device has a cover unit attached to a front side of the base cover unit. This means that the cover unit hides or covers at least the recess and a rotor positioned therein. The cover unit, however, may also extend across the entire anti-rotation device.

A rotor is arranged for rotation on the back side of the base cover unit, i.e. the side facing away from the vehicle occupant with the anti-rotation device in its installed state. The rotor is rotatably connected by a latch mechanism to the base cover unit and has a radial rib structure.

The anti-rotation device also includes a hollow receiving body. The rotor connected to the base cover unit is guided in the receiving body. The receiving body in turn is connectable to the base cover unit and has a recess.

The anti-rotation device also has an interlock system. The interlock system is mounted on a circumferential line of the recess in the receiving body. As the rotor turns in the receiving body its position therein is determined by the interlock system coming into contact with the rib structure. Thus, with the receiving body in a predefined position, reliable installation of the lock system in the receiving body is ensured. Haptic feedback is generated when the rotor is turned in the receiving unit, in that the rib structure of the rotor touches the interlock system or a part of the interlock system as the counter-element to the rib structure. The haptic feedback provides information on the rotor's momentary position in the receiving unit, i.e. the rotor's angle of rotation relative to the receiving unit or the recess. Only if the rotor is in a certain predefined (rotary) position in the receiving unit or recess is reliable installation of the locking system ensured without an additional mounting/work step of moving the rotor into position with a special tool, for example when a tumbler is inserted into the lock system. If a position is reached that is rotationally displaced relative to the certain position, the tumbler blocks itself from insertion into the installation space, for instance by parts thereof abutting the lock system. Thus, the haptic feedback of the anti-rotation device defines an installed condition of the tumbler.

It is beneficial for the rotor to have a switching lug on the side facing away from the vehicle occupant after installation of the anti-rotation device in the vehicle. The projection of the rib structure of the rotor is situated on the switching lug in such a manner that the switching lug and the rib structure form a y shape. The rotor, the switching lug and the rib are in one form integral off-tool parts. By arrangement of the switching lug in the direct vicinity of the through-hole of the tumbler, the switching lug serves to delimit the cylinder to be installed.

An advantage of the interlock system is that it has one or more interlock points. The interlock points of the interlock system are arranged on the circumferential line of the recess of the receiving body. They are in one form arranged in pairs and spaced apart by at least the width of the rib structure. The interlock points may also be arranged individually or with several in succession appropriately spaced apart. With the arrangement defined in this way, when the rib structure touches the interlock points, haptic feedback is given on the position of the tumbler during installation and actuation.

Instead of interlock points the circumferential line may also have wave-shaped indentations, such as with a double V or W shape. The appropriate structure is selected depending on the desired intensity of the haptic feedback and the force required to turn the rib structure past the interlock points. If the rib structure is in what is referred to as the zero position, the end of the rib projects into a wave trough. It follows that when the rotor turns, the rib touches a wave crest, thereby issuing haptic feedback.

To compensate tolerances related to the installation space it is advantageous for the interlock points or waves to be resiliently or elastically mounted. In this way the rotor can be turned past the interlock points with little force exerted. When the rib contacts the interlock points or waves, the latter are pressed radially outwards by the spring action. Depending on the desired intensity of the haptic feedback the interlock points/waves therefore may or may not be resiliently mounted.

In order for the tumbler to be installed as simply as possible in the anti-rotation device without the use of additional tools, the rotor should be located in a so-called zero position. This is why a pair of interlock points is arranged in the area of the zero position with a spacing of at least the width of the rib structure, in order that with a minimal turn of the tumbler as it is being installed haptic feedback is obtained indicating that the tumbler is located in the zero position. If the anti-rotation device is installed in a glove compartment, then the zero position of the rotor is defined by the geometry of the vehicle. The anti-rotation device is in the zero position when the longitudinal orientation of the rotor rib is in one form parallel to the Y axis of the vehicle.

Starting from the zero position, the tumbler can be turned by a key after the anti-rotation device has been installed, in order to close and then to open a glove compartment by a locking action. The tumbler can be turned by 180 degrees starting from the zero position, and in one form by 140 degrees, and in another form by 90 degrees. It is advantageous for additional interlock points to be located in each predefined position, which in turn supply the user with haptic feedback that the tumbler is situated in the desired position and therefore, for example, a key to the lock system can be withdrawn or inserted.

The size and dimension of the interlock points are not restricted to a dot or circular structure. The size can be varied accordingly, depending on the desired intensity of the haptic feedback. The interlock points for a lock system in a glove compartment in one form measure several millimeters in diameter, especially 5 mm to 15 mm, and in one form 8 mm to 10 mm.

The base cover unit and the rotor are connected by a latch mechanism. It is advantageous for the latch mechanism to have a bulge running along a circumferential line of the base cover unit and a groove running along a circumferential line of the rotor. The rotor is held together with the base cover unit by insertion of the bulge into the groove of the base cover unit. In spite of this latch mechanism the rotor retains its ability to rotate.

Fundamentally, the anti-rotation device may be made from any material. However, to meet demands that the vehicles be as lightweight as possible to reduce harmful emissions accordingly, the anti-rotation device is in one form made of plastic. The receiving unit in one form is a PAGF 30 (glass fiber reinforced polymer) or a similar material, and the rotor of POMGB30 (glass bead reinforced polymer) or a similar material. The anti-rotation system can also be integrated in a different manner, e.g. on the switching lug can the interlock system be integrated and can prevent the rotation of the system.

The above-described properties, features and advantages of the present disclosure, as well as the manner in which they are achieved, will become clearer and more easily understood in the following schematic description of one form, and they are explained below in greater detail with reference to the drawings. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
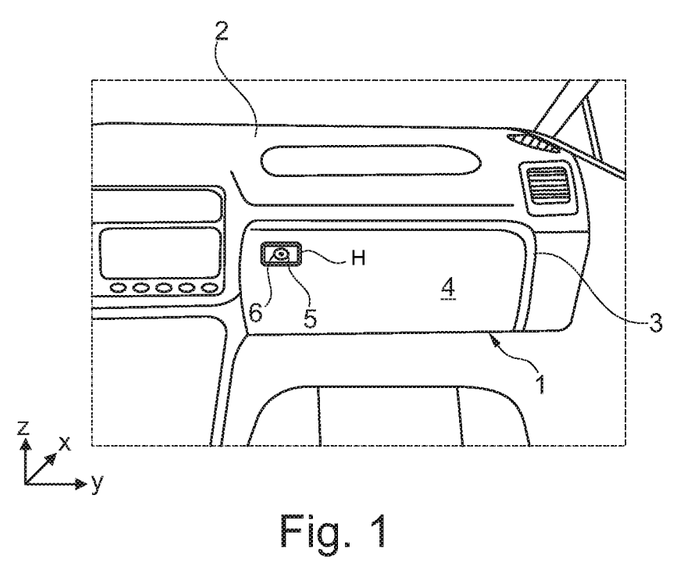
FIG. 1 shows a front view of a glove compartment device according to one form of the present disclosure.

Reference is made first of all to FIG. 1. A glove compartment 1 is mounted on a dashboard 2 and arranged in a forward section of the interior of a passenger car, for instance one in which the steering wheel is on the left and in which the glove compartment may be positioned in front of the passenger seat. The glove compartment includes a compartment body 3 integral with the dashboard 2 and a cover 4 capable of opening and closing an opening in the compartment body 3 by a vertical rotation around a horizontal axis. In addition, a lock system 6 is arranged in the cover 4 of the glove compartment 1. The lock system 6 is embedded within a cover unit 5. The cover unit 5 serves to hide an anti-rotation device for the lock system 6 from view of a vehicle occupant. The glove compartment 1 is locked or unlocked by means of the lock system 6, which includes a key (not shown) and a fitting tumbler (not shown), so that the glove compartment 1 cannot be opened at all when locked, but rather only when it is unlocked.

Figure 2:
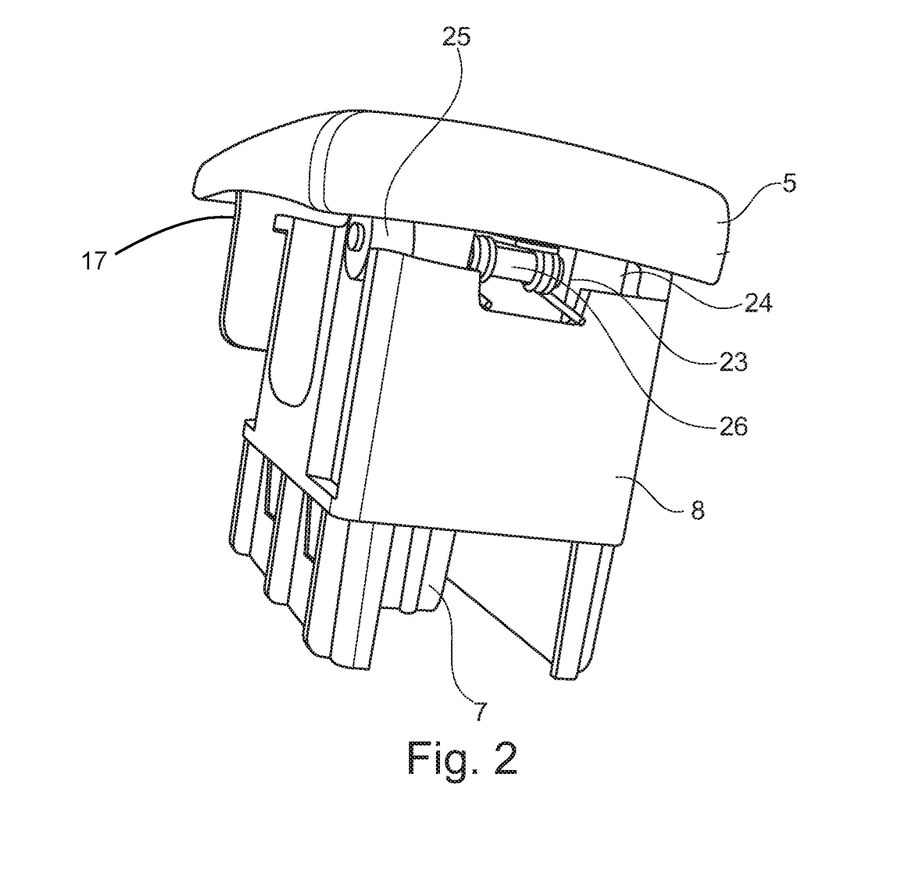
FIG. 2 shows a perspective view of the anti-rotation device according to the present disclosure.

The anti-rotation device shown in FIG. 2, which is made of plastic in one form, is mounted on and accommodated within the plastic cover 4 as shown in FIG. 1, so that the anti-rotation device is oriented in the longitudinal direction of the vehicle. An operating handle H is rotatably attached at one end for rotation in the left/right direction of the anti-rotation device. The lock system 6 includes a cylinder 6a (FIG. 3) attached to the operating handle H. A cover unit 5 is arranged on the anti-rotation device and blocks a passenger's view onto the device.

Figure 3:
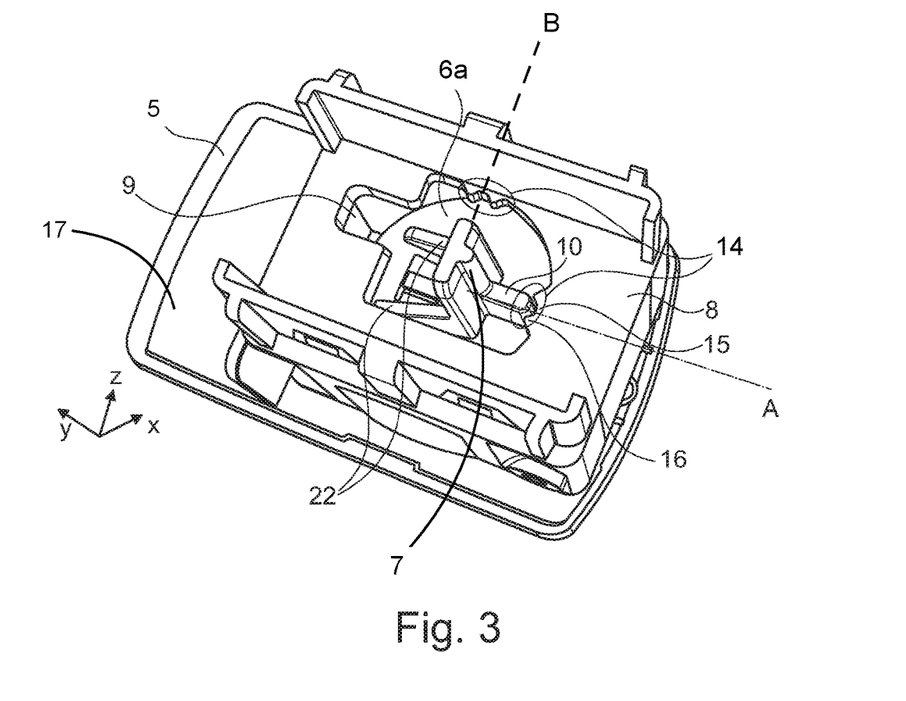
FIG. 3 shows a rear view of the anti-rotation device according to the present disclosure.

FIG. 2 shows a perspective view of the anti-rotation device of the present disclosure. A rotor 7 connected to a base cover unit 17 is guided in a hollow receiving body 8 (FIG. 3). A cover unit 5 is attached to the base cover unit 17. For example, the cover unit 5 is attached to the base cover unit 17 by a clip-on, plug-in and/or latch mechanism. At least one receiving unit 24 is arranged on the base cover unit 17 to connect the hollow receiving body 8 to the base cover unit 17. At least one additional receiving unit 25 is likewise arranged on the receiving body 8. The receiving units 24, 25 have a through-hole for a rod 26. The rotor 7 with the base cover unit connected thereto is inserted into the receiving body 8 in such a way that the receiving unit 24 of the base cover unit 17 and the additional receiving unit 25 of the receiving body 8 are aligned with one another so as to allow a rod 26 to be guided through the two receiving units 24, 25 and the receiving body 8 is connected to the base cover unit 17.

FIG. 3 shows a view from below of the anti-rotation device of the present disclosure. The tumbler (not shown) is inserted into the cylinder 6a from the top (-x direction) of the base cover unit 17, with the result that the rotor 7 and the cylinder 6a can turn between a locked position A and an unlocked position B. The rotor 7 has a ribbed structure 10. However, it is only possible to insert the tumbler into the anti-rotation device without great effort if the rotor 7 is in a so-called zero position A; that is, when the tumbler is installed, a key can be inserted into or removed from it when it is in the locked or unlocked position. When the anti-rotation device is used in a glove compartment 1 as shown in FIG. 1, the rotor 7 is in the zero position A if the longitudinal orientation of the rib 10 runs parallel to the Y axis of the vehicle.

Figure 4:
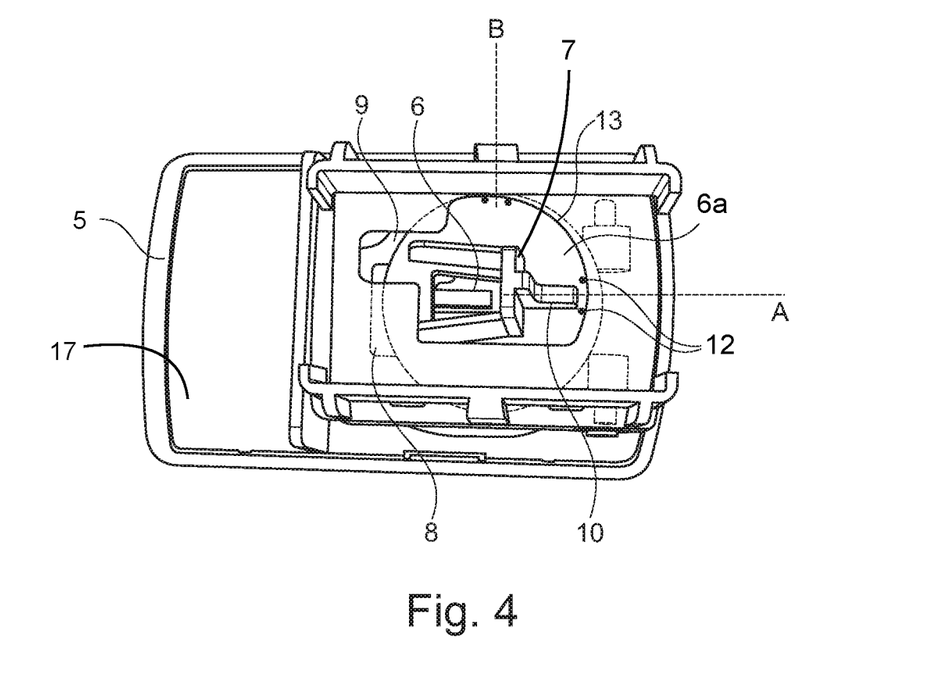
FIG. 4 shows a rear view of another anti-rotation device according to the present disclosure.

An interlock system 11 is provided to simply and easily ascertain that the rotor 7 is in the desired position for installation of the tumbler. This interlock system 11 includes interlock points 12 (shown in FIG. 4). The interlock points/nubs 12 are in one form arranged in pairs. When in the defined zero position A the interlock points 12 are arranged in spaced relationship of at least the width of the rib structure 10 and dimensioned to allow the rotor 7 to nondestructively overcome the interlock points 12 without exerting great force; however, there is haptic feedback indicating that the tumbler is or is not situated in the zero position A. The interlock points 12 are in one form dot-shaped; however they may have any other form, as long as no large forces are required to overcome them.

As FIG. 3 shows, the circumferential line 13 may also have wave-shaped bulges 14 or a W or double-V-shaped structure instead of the interlock points 12. The end of the rib 10 projects into a wave trough 15 when it is in the zero position. When the rotor 7 is turned, the rib 10 then touches a wave crest 16, thus giving haptic feedback.

To compensate tolerances and haptics with regard to installation space, it is beneficial for the interlock points or waves to be resiliently and/or elastically mounted. This makes it possible for the rotor 7 to be rotated past the interlock points 12 or wave-shaped bulges 14 with a low exertion of force. When the rib 10 touches the interlock points 12 or wave-shaped bulges 14, the latter are radially urged outwards by the spring action. The interlock points 12 or wave-shaped bulges 14 may be mounted resiliently or not, depending on the desired intensity of the haptic feedback.

However, the present disclosure is not restricted to interlock points. Any arrangement or bulge is conceivable by which haptic feedback can be generated in order to ascertain the tumbler's position.

A pair of interlock points is in one form located in the zero position A and an additional pair of interlock points in a 90° position B of the tumbler. Only in these two positions can a key be inserted into or removed from the tumbler, due to the features of the components.

The interlock system 11 is in one form incorporated in a recess 9 of the receiving body 8. This makes it possible to produce the interlock system 11 off-tool together with the receiving body 8.

The receiving unit 8 and the rotor 7 are in one form made of plastic. Specifically, the plastics PAGF30 or POMGB30 are especially well suited.

Figure 5:
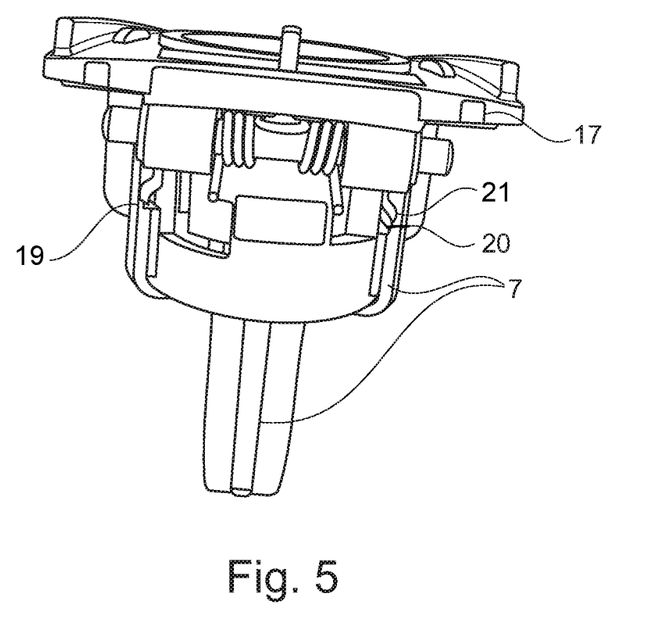
FIG. 5 shows a longitudinal cut through an anti-rotation device according to the present disclosure.

FIG. 5 shows a longitudinal section through an anti-rotation device according to the present disclosure. A latch mechanism 19 in FIG. 5 shows how the base cover unit 17 is connected to the rotor 7. The base cover unit 17 has a bulge 20 running on a circumferential line, whereas the rotor 7 has a groove 21 on a line running circumferentially, corresponding to the bulge 20. When the two components 7, 17 are put together, the bulge 20 is placed into the groove 21 and remains in this position with no force being exerted. With this type of latch mechanism 19 the rotor 7 is connected to the base cover unit 17, but it retains its rotating capability nonetheless.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An anti-rotation device for a lock system in a motor vehicle, comprising:
    a base cover unit with an opening for passage of a lock system;
    a rotor rotatably attached by a latch mechanism to a back side of the base cover unit, with the rotor having a radial rib structure;
    a hollow receiving body accommodating the rotor and capable of being connected to the base cover unit, with the receiving body having a recess; and
    an interlock system comprising resiliently mounted interlock points arranged in pairs on a circumferential line of the recess of the receiving body, wherein a position of the rotor in the receiving body is determined in that the resiliently mounted interlock points are urged radially outwards with a spring action when the radial rib structure contacts the interlock system such that the rotor is rotated past the interlock points, in order to install the lock system in the receiving body when the rotor is in a predefined position.

2. The anti-rotation device according to claim 1, wherein the interlock points are spaced at least a width of the rib structure.

3. The anti-rotation device according to claim 1, wherein the interlock points are spaced apart at a distance of 5 mm to 15 mm.

4. The anti-rotation device according to claim 3, wherein the interlock points are spaced apart at a distance of 8 mm to 10 mm.

5. The anti-rotation device according to claim 1, wherein the interlock system is in the shape of a double V on the circumferential line.

6. The anti-rotation device according to claim 1, wherein the rotor, starting from a zero position, is rotatable by 140 degrees, wherein an additional interlock point pair or a double-V-shaped structure is arranged in additional positions, to allow an additional predefined joining position to be determined.

7. The anti-rotation device according to claim 1, wherein the rotor, starting from a zero position, is rotatable by 90 degrees, wherein an additional interlock point pair or a double-V-shaped structure is arranged in additional positions, to allow an additional predefined joining position to be determined.

8. The anti-rotation device according to claim 1, wherein the interlock system is integrally connected to the receiving body.

9. The anti-rotation device according to claim 1, wherein the latch mechanism is formed by a bulge running on a circumferential line of the base cover unit and by a groove running on a circumferential line of the rotor, wherein the rotor is held in the base cover unit by insertion of the bulge into the groove while still retaining its ability to rotate in the base cover unit.

10. The anti-rotation device according to claim 1, wherein the receiving body and the rotor are made of plastic.

11. The anti-rotation device according to claim 1, wherein the receiving body and the rotor are made of a reinforced plastic.

12. The anti-rotation device according to claim 11, wherein the reinforced plastic comprises fibers or beads.

13. The anti-rotation device according to claim 1, wherein the anti-rotation device is used in a glove compartment.

14. A motor vehicle having the anti-rotation device according to claim 1.

15. An anti-rotation device for a lock system comprising:
a base cover unit with an opening for passage of a lock system;
a rotor rotatably attached by a latch mechanism to a back side of the base cover unit, with the rotor having a radial rib structure;
a hollow receiving body accommodating the rotor and capable of being connected to the base cover unit, with the receiving body having a recess; and
an interlock system comprising resiliently mounted interlock points arranged in pairs on a circumferential line of the recess of the receiving body, wherein a position of the rotor in the receiving body is determined in the resiliently mounted interlock points are urged radially outwards with a spring action when the radial rib structure contacts the interlock system such that the rotor is rotated past the interlock points, in order to install the lock system in the receiving body when the rotor is in a predefined position,
wherein the interlock system functions to provide haptic feedback to a user when the rotor is rotated.

16. The anti-rotation device according to claim 15, wherein the interlock system is in the shape of a double V on the circumferential line.

* * * * *